Patented May 23, 1933

1,910,808

UNITED STATES PATENT OFFICE

GEORGE F. MOORE, OF TAMPA, FLORIDA, ASSIGNOR TO U. S. PHOSPHORIC PRODUCTS CORPORATION, OF NEW YORK, N. Y., A CORPORATION OF DELAWARE

PROCESS OF PREPARING PHOSPHORIC ACID

No Drawing.  Application filed August 15, 1930. Serial No. 475,637.

This invention relates to improvements in processes for the preparation of pure phosphoric acid from phosphatic materials in the wet way. In its broader and more general aspects, the invention contemplates a multi-stage treatment of phosphatic materials whereby pure water insoluble calcium phosphate is formed, which may subsequently be treated with pure sulphuric acid for the production of pure phosphoric acid. More particularly, the invention is concerned with a novel method of treating phosphate rock in several stages to obtain the calcium phosphate content of the rock in a pure state, and subsequently converting the pure salt or salts thus obtained to pure ortho-phosphoric acid by treatment with sulphuric acid.

Present methods for the production of phosphoric acid in the wet way are usually characterized by a preliminary conversion of phosphatic material to crude phosphoric acid in one step by treatment of the raw material with dilute sulphuric acid. The subsequent purification necessary is attended with many difficulties, and such processes are further disadvantageous by reason of the expensive concentrating operations necessary to be applied to the phosphoric acid to obtain the ultimate product in a form suitable for commercial use.

I have discovered that phosphoric acid of considerably enhanced purity may be produced by treating the raw material in such a manner as to remove all impurities before final conversion of the phosphate content to phosphoric acid. Accordingly, I first treat the phosphatic raw material with sulphuric acid to form water soluble mono-calcium phosphate, subsequently converting the mono-calcium phosphate successively to ammonium phosphate, water insoluble calcium phosphate, and finally phosphoric acid. By suitable manipulations at the various stages of my process, I am enabled to eliminate the impurities originally present in the raw materials with considerably less trouble and expense than is involved in the purifying operations utilized under the present practice. By dealing with weakly acid and nearly neutral solutions throughout the stages intermediate the initial acid treatment for conversion to mono-calcium phosphate and the final step of converting the pure insoluble phosphate formed in the process to pure phosphoric acid, the separation of precipitated impurities is greatly facilitated, and the incorporation of a crystallization step in the process insures greatly enhanced purity of the ultimate product.

The adaption of my process to the treatment of phosphate rock or pebble phosphate will now be set forth as a typical example for the presentation of the combination of operations making up the process embodied in my invention. It is to be understood that the invention is clearly adaptable to the treatment of other phosphatic materials, either natural or artificial in their origin.

The phosphatic raw material, as for example pebble phosphate, is first subjected to the action of sufficient concentrated sulphuric acid to convert the calcium phosphate content of the rock to mono-calcium phosphate but insufficient to convert more than a minor portion thereof to free phosphoric acid. By way of example, the acidulation may be so controlled as to produce a solution wherein about one-fourth of the total phosphate content is present as free phosphoric acid with the balance mono-calcium phosphate. The solution of mono-calcium phosphate thus formed is then treated, either after separating the same from the calcium sulphate and other insoluble residues formed in the conversion step above mentioned or while still admixed with such residues as a slurry, with sufficient ammonium sulphate to precipitate the soluble calcium as insoluble calcium sulphate by converting the mono-calcium phosphate to mono-ammonium phosphate, which remains in solution. The mono-ammonium phosphate being readily water soluble, will remain in solution while the larger portion of the acid soluble impurities is precipitated, in an easily separable state, upon neutralizing any free acid which may be present with ammonia. The insoluble residues and precipitates are separated from the solution by decantation and filtration and may be conveniently washed with water in order to insure complete recovery of the phosphate. The washings are added to the solution of ammonium phosphate, which is then concentrated preliminary to crystallizing out the ammonium phosphate content. The crystals are freed of mother liquor by centrifuging or other suitable means, and subsequently washed with saturated colorless ammonium phosphate solution to occasion the elimination of any color-imparting impurities which may still be present. The washed crystals comprising pure ammonium phosphate are then dissolved in sufficient pure water to form a fairly concentrated solution, which is subsequently treated with pure calcium carbonate or pure lime, and boiled. The resulting reactions occasion the precipitation of the phosphate as pure water insoluble calcium phosphate. When calcium carbonate is used as the precipitant the reaction is attended with evolution of carbon dioxide and ammonia. The evolved vapors from this treatment are subsequently recovered and recycled in the manner hereinafter indicated to occasion an additional economy in the operation of the process. The precipitate from this treatment, after separation from the solution and washing with water, comprises pure calcium phosphate in the form of di-calcium phosphate, tri-calcium phosphate or a mixture of both salts.

The pure calcium phosphate prepared as indicated above, is next treated with pure sulphuric acid to occasion the conversion of the phosphate to phosphoric acid with attendant precipitation of pure, snow white gypsum. The phosphoric acid solution is searated from the precipitated gypsum by decantation and filtration, and may, if desired, be subjected to the usual hydrogen sulphide treatment for the removal of any arsenic which may be present. The resulting product is a pure, water white solution of ortho-phosphoric acid, suitable for any commercial or industrial use. In view of its high degree of purity, the acid thus formed is particularly adapted to the preparation of baking powders or other food products.

The gypsum resulting from the treatment of the pure water insoluble calcium phosphate with sulphuric acid may be conveniently mixed with an aqueous solution of ammonia to form a slurry for use as an absorbent for the carbon dioxide and ammonia evolved during an intermediate operation of the process, as indicated in the preceding exposition. This operation results in the precipitation of pure calcium carbonate and the formation of a pure solution of ammonium sulphate. The ammonium sulphate solution or such portion as is needed is recycled to the preliminary operation involving the treatment of mono-calcium phosphate solution with ammonium sulphate, thus effecting a recovery of substantially all of the ammonia used in the process with consequent lowering of the operating costs and producing a valuable by-product. The precipitated calcium carbonate, being of a high degree of purity, is suitable for use, either as a reagent in the process by recycling to the intermediate operation involving the treatment of the concentrated ammonium phosphate solution with calcium carbonate, thus effecting a further economy in the process, or may, if desired, be treated with pure phosphoric acid formed in the process to produce pure mono-calcium phosphate for use in the manufacture of baking powder or other food products. Thus a substantially complete recovery of the ammonia and a partial recovery of the sulphuric acid used in the process is effected, making for greater economy in operation.

It is to be understood that my invention contemplates the substitution, if desired, of the respective sodium or potassium equivalents of the ammonia referred to in the preceding exposition of my process. For example, instead of neutralizing the original solution with ammonia, I may, if desired, utilize suitable basic compounds of sodium or potassium, such as the hydroxide or the carbonate in this connection. In such cases, sodium or potassium sulphate will be added in place of the ammonium sulphate referred to above, for the purpose of precipitating the soluble calcium as insoluble calcium sulphate. The solution will then contain mono-sodium or mono-potassium phosphate, as the case may be, which is subsequently treated in the manner set forth in the preceding example. I find it particularly convenient to adapt the sodium equivalents of ammonia to the operation of the process herein set forth, inasmuch as sodium sulphate in a high state of purity is obtained as a by-product in the operation of the process described and claimed in my co-pending application, Serial No. 484,472, filed September 25, 1930. By effecting such modification in my present process, the said process may be conveniently and economically operated in conjunction with the process embodied in the aforementioned co-pending application. These and other similar modifications logically concerned with the operation of my process herein set forth, are to be considered as integrally related to said process and falling well within the scope of my invention.

I claim:

1. The process of preparing pure orthophosphoric acid, which comprises subjecting a phosphatic material to the action of sufficient sulphuric acid to convert the phosphate content thereof to mono-calcium phosphate but insufficient to convert more than a minor portion thereof to free phosphoric acid, forming an aqueous solution of the mono-calcium phosphate so produced, treating the solution with an alkali sulphate to precipitate the calcium as calcium sulphate with simultaneous formation of a water-soluble alkali phosphate, neutralizing any free acid which may be present with an alkali corresponding to the alkali radical of said alkali sulphate with formation of a further portion of water-soluble alkali phosphate, separating the solution of alkali phosphate thus formed from the insoluble residues and precipitates, purifying the alkali phosphate by crystallization, dissolving the crystallized alkali phosphate in pure water, treating the solution so formed with a calcium compound capable of reacting with the alkali phosphate to produce a water-insoluble calcium phosphate, thereby precipitating the phosphate content of said solution as an insoluble calcium phosphate, separating the precipitated calcium phosphate and subjecting the same to the action of pure sulphuric acid to form a solution of pure ortho-phosphoric acid.

2. The process of preparing pure orthophosphoric acid, which comprises subjecting a phosphatic material to the action of sufficient sulphuric acid to convert the phosphate content thereof to mono-calcium phosphate but insufficient to convert more than a minor portion thereof to free phosphoric acid, forming an aqueous solution of the mono-calcium phosphate so produced, treating the solution with ammonium sulphate to precipitate the calcium as calcium sulphate with simultaneous formation of mono-ammonium phosphate, neutralizing any free acid which may be present with ammonia, separating the solution of ammonium phosphate thus formed from the insoluble residues and precipitates, purifying the ammonium phosphate by crystallization, dissolving the crystallized ammonium phosphate in pure water, treating the solution so formed with a calcium compound capable of reacting with the ammonium phosphate to produce a water-insoluble calcium phosphate, thereby precipitating the phosphate content of said solution as an insoluble calcium phosphate, separating the precipitated calcium phosphate and subjecting the same to the action of pure sulphuric acid to form a solution of pure ortho-phosphoric acid.

3. The process of preparing pure orthophosphoric acid, which comprises subjecting a phosphatic material to the action of sufficient sulphuric acid to convert the phosphate content thereof to mono-calcium phosphate, but insufficient to convert more than a minor portion thereof to free phosphoric acid, forming an aqueous solution of the mono-calcium phosphate so produced, treating the solution with ammonium sulphate to precipitate the calcium as calcium sulphate with simultaneous formation of mono-ammonium phosphate, neutralizing any free acid which may be present with ammonia, separating the solution of ammonium phosphate thus formed from the insoluble residues and precipitates, purifying the ammonium phosphate by crystallization, dissolving the crystallized ammonium phosphate in pure water, treating the solution so formed with pure calcium carbonate to precipitate pure water-insoluble calcium phosphate and form free ammonia and free carbon dioxide, separating the precipitated calcium phosphate from the solution, subjecting the said calcium phosphate thus formed to the action of pure sulphuric acid to form a solution of pure ortho-phosphoric acid and pure calcium sulphate as a precipitate, separating said acid solution from said calcium sulphate, treating said calcium sulphate with the ammonia and carbon dioxide liberated as aforesaid to produce pure ammonium sulphate and pure calcium carbonate, and separating said ammonium sulphate and said calcium carbonate and returning these compounds for use in earlier stages of the process as aforesaid.

4. In a process of preparing pure phosphorus-containing compounds from impure water-insoluble calcium phosphatic materials, the steps which comprise subjecting such a material to the action of sufficient sulphuric acid to convert the phosphate content thereof to mono-calcium phosphate but insufficient to convert more than a minor portion thereof to free phosphoric acid, forming an aqueous solution of the mono-calcium phosphate so produced, treating the solution with an alkali sulphate to precipitate the calcium as calcium sulphate with simultaneous formation of a water-soluble alkali phosphate, neutralizing any free acid which may be present with an alkali corresponding to the alkali radical of said alkali sulphate with formation of a further portion of water-soluble alkali phosphate, separating the solution of alkali phosphate thus formed from the insoluble residues and precipitates, purifying the alkali phosphate by crystallization, dissolving the crystallized alkali phosphate in pure water, treating the solution so formed with a calcium compound capable of reacting with the alkali phosphate to produce a water-insoluble calcium phosphate, thereby precipitating the phosphate content of said solution as an insoluble calcium phosphate, and separating the precipitated calcium phosphate.

5. The process of preparing pure orthophosphoric acid, which comprises subjecting phosphate rock to the action of sufficient sulphuric acid to convert the phosphate content of the rock to mono-calcium phosphate but insufficient to convert more than a minor portion thereof to free phosphoric acid, forming an aqueous solution of the mono-calcium phosphate so produced, treating the solution with an alkali sulphate to precipitate the calcium as calcium sulphate with simultaneous formation of an alkali phosphate, neutralizing any free acid which may be present with a suitable alkali, separating the solution of alkali phosphate from the insoluble residues and precipitates, purifying the alkali phosphate by crystallization, dissolving the crystallized alkali phosphate in pure water, treating the solution so formed with pure calcium carbonate to precipitate pure water-insoluble calcium phosphate, separating the precipitated calcium phosphate from the solution, and subjecting the said calcium phosphate thus formed to the action of pure sulphuric acid to form a pure solution of ortho-phosphoric acid.

6. The process of preparing pure ortho-phosphoric acid, which comprises subjecting phosphate rock to the action of sufficient sulphuric acid to convert the phosphate content of the rock to mono-calcium phosphate but insufficient to convert more than a minor portion thereof to free phosphoric acid, forming an aqueous solution of the mono-calcium phosphate so produced, treating the solution with an alkali sulphate to precipitate the calcium as calcium sulphate with simultaneous formation of an alkali phosphate, neutralizing any free acid which may be present with a suitable alkali, separating the solution of alkali phosphate from the insoluble residues and precipitates, purifying the alkali phosphate by crystallization, separating the crystallized salt from the mother liquor, dissolving the crystallized alkali phosphate in pure water, treating the solution so formed with pure calcium carbonate to precipitate pure di-calcium phosphate, separating the precipitated di-calcium phosphate from the solution, and subjecting the di-calcium phosphate thus formed to the action of pure sulphuric acid to form a pure solution of ortho-phosphoric acid.

7. The process of preparing pure ortho-phosphoric acid, which comprises subjecting phosphate rock to the action of sufficient sulphuric acid to convert the phosphate content of the rock to mono-calcium phosphate but insufficient to convert more than a minor portion thereof to free phosphoric acid, forming an aqueous solution of the mono-calcium phosphate so produced, treating the solution with an alkali sulphate to precipitate the calcium as calcium sulphate with simultaneous formation of an alkali phosphate, neutralizing any free acid which may be present with a suitable alkali, separating the solution of alkali phosphate from the insoluble residues and precipitates, purifying the alkali phosphate by crystallization, separating the crystallized salt from the mother liquor, dissolving the crystallized alkali phosphate in pure water, reacting the solution so formed with pure calcium carbonate at an elevated temperature to precipitate pure tri-calcium phosphate, separating the precipitated tri-calcium phosphate from the solution, and subjecting the tri-calcium phosphate thus formed to the action of pure sulphuric acid to form a pure solution of ortho-phosphoric acid.

8. The process of preparing pure ortho-phosphoric acid, which comprises subjecting phosphate rock to the action of sufficient sulphuric acid to convert the phosphate content of the rock to mono-calcium phosphate but insufficient to convert more than a minor portion thereof to free phosphoric acid, forming an aqueous solution of the mono-calcium phosphate so produced, treating the solution with ammonium sulphate to precipitate the calcium as calcium sulphate with simultaneous formation of mono-ammonium phosphate, neutralizing any free acid which may be present with ammonia with formation of a further portion of ammonium phosphate, separating the solution of mono-ammonium phosphate from the insoluble residues and precipitates, purifying the mono-ammonium phosphate by crystallization, dissolving the crystallized mono-ammonium phosphate in pure water, treating the solution so formed with pure calcium carbonate to precipitate pure tri-calcium phosphate, separating the precipitated tri-calcium phosphate from the solution, and subjecting the tri-calcium phosphate thus formed to the action of pure sulphuric acid to form a pure solution of ortho-phosphoric acid.

9. The process of preparing pure ortho-phosphoric acid, which comprises subjecting phosphate rock to the action of sufficient sulphuric acid to convert the phosphate content of the rock to mono-calcium phosphate but insufficient to convert more than a minor portion thereof to free phosphoric acid, forming an aqueous solution of the mono-calcium phosphate so produced, treating the solution with sodium sulphate to precipitate the calcium as calcium sulphate with simultaneous formation of mono-sodium phosphate, neutralizing any free acid which may be present with a basic sodium compound, separating the solution of mono-sodium phosphate from the insoluble residues and precipitates, purifying the mono-sodium phosphate by crystallization, dissolving the crystallized mono-sodium phosphate in pure water, reacting the solution so formed with pure calcium carbonate to precipitate pure tri-calcium phosphate, separating the precipitated tri-calcium phosphate from the solution, and subjecting the tri-calcium phosphate thus formed to the action of pure sulphuric acid to form a pure solution of ortho-phosphoric acid.

10. The process of preparing pure ortho-phosphoric acid, which comprises subjecting phosphate rock to the action of sufficient sulphuric acid to convert the phosphate content of the rock to mono-calcium phosphate but insufficient to convert more than a minor portion thereof to free phosphoric acid, forming an aqueous solution of the mono-calcium phosphate so produced, treating the solution with potassium sulphate to precipitate the calcium as calcium sulphate with simultaneous formation of mono-potassium phosphate, neutralizing any free acid which may be present with a basic potassium compound, separating the solution of mono-potassium phosphate from the insoluble residues and precipitates, purifying the mono-potassium phosphate by crystallization, dissolving the crystallized mono-potassium phosphate in pure water, reacting the solution so formed with pure calcium carbonate to precipitate pure tri-calcium phosphate, separating the precipitated tri-calcium phosphate from the solution, and subjecting the tri-calcium phosphate thus formed to the action of pure sulphuric acid to form a pure solution of orthophosphoric acid.

In testimony whereof, I have signed my name to this specification this 2nd day of August, 1930.

GEORGE F. MOORE.